United States Patent [19]

Howlett

[11] Patent Number: 4,697,255

[45] Date of Patent: Sep. 29, 1987

[54] IMPLOSION TYPE ENERGY SOURCE FOR SEISMIC EXPLORATION

[75] Inventor: Donald L. Howlett, Kingwood, Tex.

[73] Assignee: Texaco Inc., White Plains, N.Y.

[21] Appl. No.: 884,830

[22] Filed: Jul. 11, 1986

[51] Int. Cl.⁴ ............................................. H04R 23/00
[52] U.S. Cl. .................................... 367/146; 181/115; 181/120
[58] Field of Search ............... 367/141, 142, 146, 144; 181/110, 115, 120

[56] References Cited

U.S. PATENT DOCUMENTS

| 3,642,089 | 2/1972 | Parker et al. | 367/146 |
| 4,381,044 | 4/1983 | Kirby | 367/144 |
| 4,603,409 | 7/1986 | Jaworski | 367/146 |

Primary Examiner—Charles T. Jordan
Assistant Examiner—John W. Eldred
Attorney, Agent, or Firm—Robert A. Kulason; James J. O'Loughlin; Robert B. Burns

[57] ABSTRACT

An acoustic energy source or gun for use in an aqueous environment such as in a borehole, a well, or in open water. The apparatus, when lowered into a water occupied borehole or the like, functions to create a series of acoustic impulses without forming bubbles, as a result of the water rapidly infilling an implosion cylinder or chamber. A piston rod assembly is reciprocally mounted in each acoustic chamber and is actuated by a power source to trigger the desired sound creating series of impulses.

7 Claims, 2 Drawing Figures

IMPLOSION TYPE ENERGY SOURCE FOR SEISMIC EXPLORATION

BACKGROUND OF THE INVENTION

In the art of seismic exploration, a primary purpose is to create an impulse or series of impulses that can be recorded to refl9ct the environment through which the impulses pass. In the instance of offshore seismic exploration, or in the instance of a borehole such as a well, the liquid environment is utilized as part of the sound creating and transmitting medium.

Different forms of underwater acoustic sources, often referred to as seismic guns, are known and widely used by the petroleum industry. These devices cover both the explosion type, and the implosion type. Functionally, the surrounding water can be caused to explode outwardly to create an acoustic discharge. Similarly, a rapidly flowing water mass into an evacuated area, can effect a sound producing, readable impulse.

In the instance of well boreholes, or in a deep body of water, it is necessary to convey or direct the impulse creating medium to the submerged gun whereby to trigger the latter. It is therefore necessary to provide a sufficient length of tubing, cable or similar conduit through which the power medium, normally water or a hydraulic fluid, travels.

In the disclosed apparatus, the acoustic sound source is particularly adapted for use in a well bore wherein an amount of water has accumulated for a considerable depth. The acoustic apparatus is provided with at least one implosion chamber. The latter is adapted to be evacuated of water, and thereafter to admit a rapid inflow of the surrounding water thereby to create conditions for the implosion.

The implosion chamber slidably receives a piston assembly in a manner that the water can be displaced from said chamber with each piston stroke. At the end of the piston travel, water will be rapidly released into the evacuated implosion chamber, causing the latter to rapidly fill.

Subsequent movement of the actuating piston to its retracted position is accomplished through a check valve which permits trapped water to be discharged from the implosion chamber as the piston moves.

As herein shown, the novel apparatus comprises an elongated body having a pair of oppositely positioned implosion chambers. The rate of acoustic implosions can thereby be doubled. This is achieved by use of a double ended piston rod, each piston head being registered in one of the oppositely positioned implosion chambers.

It is therefore an object of the invention to provide an acoustic energy apparatus of the type contemplated which is adapted to function in an underwater environment.

A further object is to provide an acoustic energy gun of the type wherein the surrounding liquid medium such as water, is used as the impulse creating medium by virtue of an implosion action.

A still further object is to provide an underwater acoustic energy source which is powered by a hydraulic pump or the like positioned remotely from the apparatus, whereby to establish a continuous series of recordable sounds as a result of sequential implosions.

Figure 1:
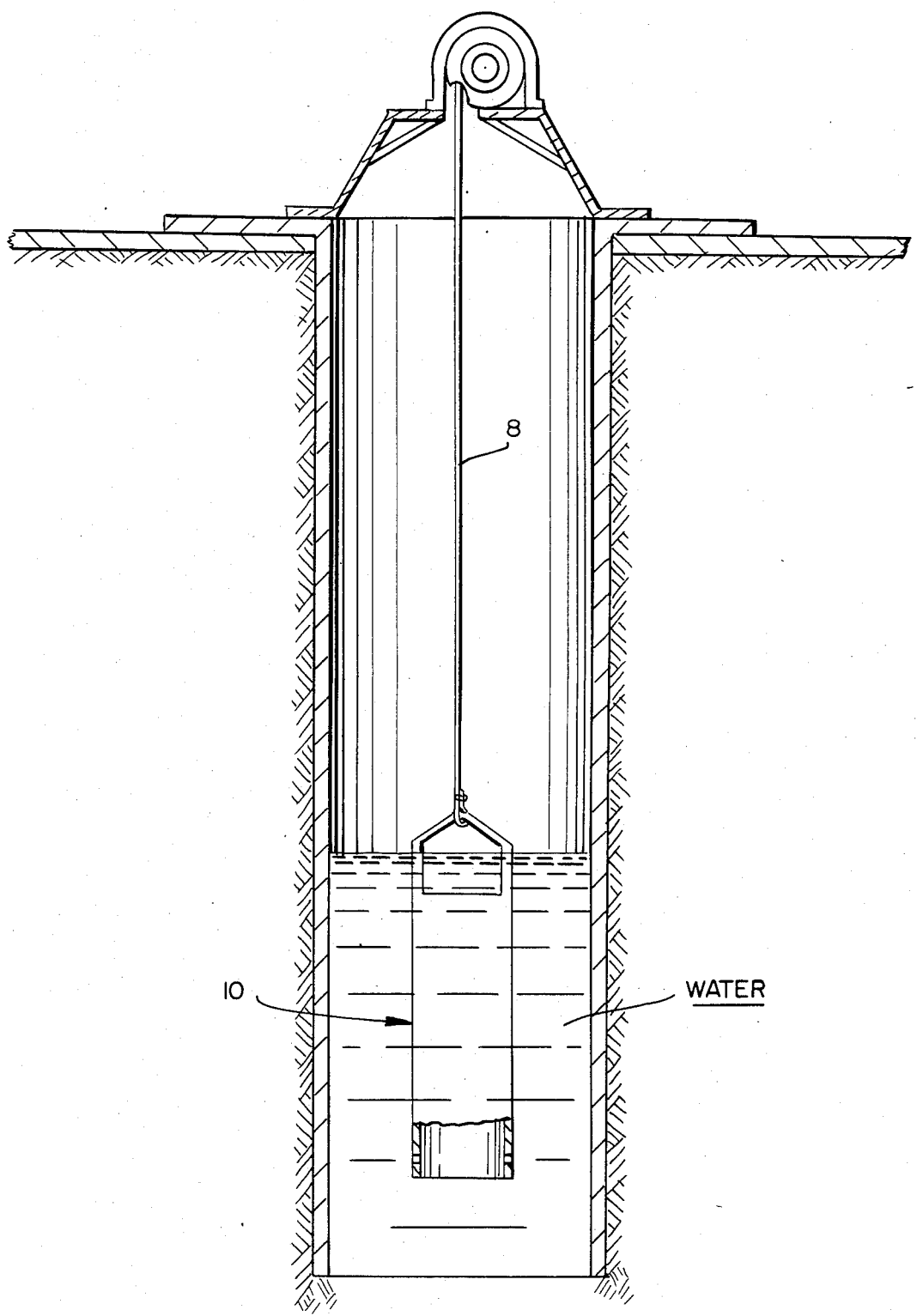
FIG. 1 is an environmental depicton of the invention in a well or borehole.
Figure 2:
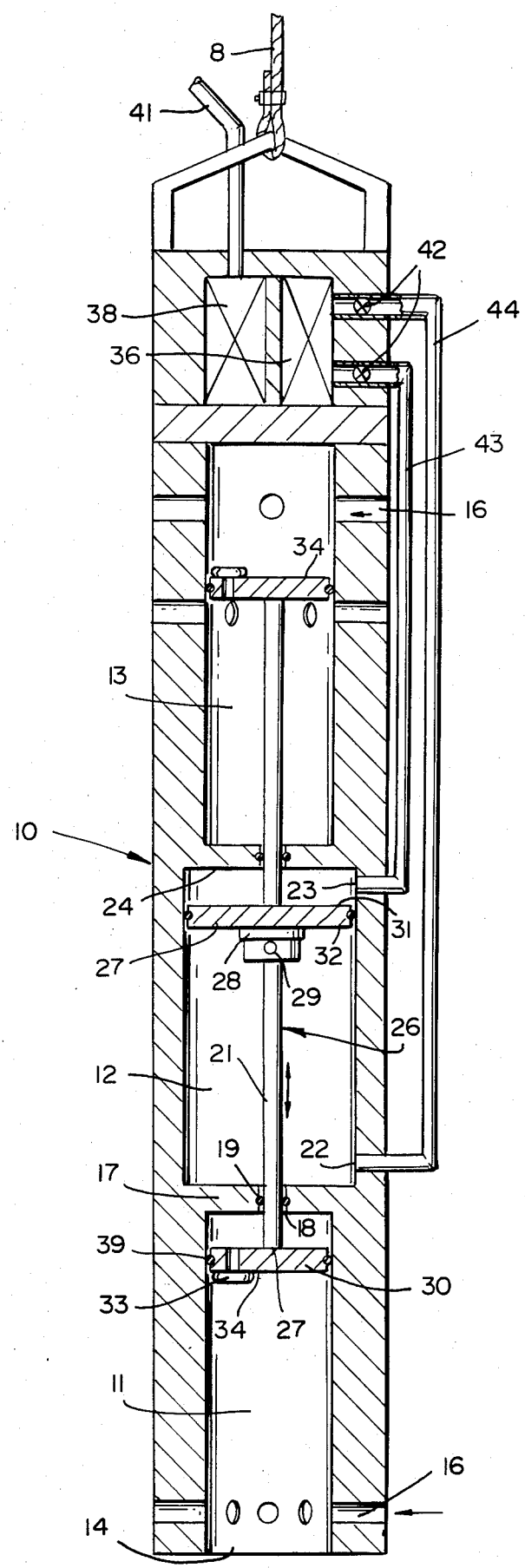
FIG. 2 is a cross-sectional view on an enlarged scale taken along line 2—2 in FIG. 1.

Referring to the Figures, one embodiment of the apparatus contemplated, is shown comprising a generally elongated casing 10. The latter is adapted to be supported by a cable 8 and lowered through a well bore or well casing 9, and into the lower, water containing end of the latter. The casing is preferably formed of metal and structured with a cylindrical exterior. A plurality of axially aligned cavities 11, 12 and 13 extend longitudinally of casing 10.

Cavities 11 and 13 formed at opposed ends of casing 10, define implosion chambers. Central cavity 12 positioned intermediate the terminal implosion chambers, defines a hydraulic or power chamber. A hydraulic fluid, or water is forced into said central chamber as an actuating medium as will be hereinafter shown.

Implosion chambers 11 and 13 are substantially equivalent in both structure and function. Implosion chamber 11, for example, is provided with an open end or enlarged port 14 which communicates with the surrounding liquid environment. The latter, as mentioned, can be a pool in the lower end of a well reservoir, or a natural body of water in which the apparatus operates. The smooth walled cylindrical chamber 11 terminates at one, and preferably in a series of peripherally arranged implosion ports 16.

The wall thickness of chamber 11 is necessarily sufficient to withstand both the pressure resulting from the surrounding water depth, and also the physical shock created within the chamber as a result of the rapid inflow, and forced outflow of water.

The hydraulic or power chamber 12 is separated from implosion chamber 11 by an intermediate wall 17. Said wall includes a central port 18 in which an annular seal 19 is retained. The seal includes a center opening adapted to operably receive a piston rod 21, and permit reciprocatory piston movement through the opening, without substantial water leakage.

Wall 17 can comprise an insert which is removably positioned in casing 10 as by threads or the like. As shown, however, it can also be integral with the casing longitudinal cavities. This latter construction would require a split casing or similar construction, to permit access to the casing interior.

Hydraulic, or power chamber 12 as shown is aligned between, and coaxially of the respective implosion chambers 11 and 13. It is further provided with at least two access ports 22 and 23. Said ports are positioned adjacent to the respective opposed end walls 17 and 24 of said hydraulic chamber 12.

The power or actuating element is comprised of a hydraulic piston assembly 26. The latter includes elongated piston rod 21 which is sufficient in length to slidably traverse the respective end walls 17 and 24 of hydraulic chamber 12. Piston rod 21 is provided with a central piston head 27. The latter can include at least one hub 28 adapted to fixedly position head 27 by threading or by fastening screws 29, which engage rod 21.

The skirt or peripheral edge 31 of piston head 27 is provided with a dynamic sealing means 32. The latter is adapted to slidably contact adjacent cylindrical walls of chamber 12 to form a substantially fluid tight, yet dynamic engagement therewith as piston assembly 26 reciprocates.

Piston heads 30 and 34 are fastened to opposite ends of piston rod 21. Each piston head, 30 for example, is provided with a peripheral or edge seal 39. The latter slidably engages the adjacent wall of implosion chamber 11 to assure that said chamber is effectively evacuated of water as the piston head 30 advances toward end opening or port 14.

During the period when piston head 30 advances toward opening 14, water is urged from implosion chamber 11 through ports 14 and 16, by check valve 33 which is forced into closed position. On the piston 30 retracting stroke, valve 34 will be forced into open position to allow outflow of water from the portion of chamber 11 which terminates at wall 17.

The power means for reciprocally actuating piston rod assembly 26 through the respective implosion chambers 11 and 13, is achieved by a pump 36, which is contained in pump compartment 37. Said compartment comprises an adjunct to casing 10 and can be detachably fixed to the latter, or made a permanent part thereof.

Pump 36, although not presently shown in detail, is connected to drive motor 38, usually electrically powered. Said motor can be of the variable speed type and remotely controlled through electric cable 41, to regulate pump speed and consequently the rate of the acoustic implosion frequency.

Drive motor 38 is therefore connected through said cable 41, to appropriate control means at the surface of the well or on a floating vessel when such is used at an offshore site.

Pump 36, when operating on a closed fluid system, is communicated at inlet and outlet through a remotely actuated valve system 41, with power chamber 12. Thus, conduits 43 and 44 communicate through valve system 41 and ports 22 and 23. Said fluid can be sequentially urged under pressure, into one end of chamber 12, while it is exhausted through the chamber opposite end.

When an open fluid system is utilized, the fluid, normally water, is furnished to the pump, and thereafter discharged into the surrounding water. Such a system, however, can introduce the possibility of discharged water disturbing seismic readings.

It further requires additional valve means to regulate water flow from chamber 12.

Fluid flow into and from chamber 12 by way of pump 36, is regulated by valve means communicated between the pump and said chamber. While not shown in detail, the valve means is controllably operable to determine the frequency of the seismic event in each of the implosion chambers 11 and 13 and the travel through the power chamber.

It is understood that although modifications and variations of the invention can be made without departing from the spirit and scope thereof, only such limitations should be imposed as are indicated in the appended claims.

I claim:

1. An acoustic energy source for use in an aqueous environment to create implosion triggered seismic impulses in a body of water which comprises
    a casing having a wall defining at least two spaced apart elongated implosion chambers and a power chamber therebetween,
    means forming an implosion port in a wall of said at least two implosion chambers communicating each of the latter with the surrounding body of water,
    a piston rod assembly including a head 27 slidably received in said power chamber, having first and second piston heads 30 and 34 reciprocally positioned in said first and second implosion chambers for sequentially displacing water respective first and second chambers when a piston head is moved toward said implosion port to evacuate water from the implosion chamber and to permit rapid entry of water into the evacuated implosion chamber when said piston head has traversed the implosion port in said implosion chamber whereby to create a hydraulic shock, and
    fluid power means communicated with said power chamber for sequentially impacting against said piston rod assembly to impart said reciprocatory movement thereto in a direction axially of the elongated implosion chambers during successive water displacing and water entry stages of the latter's operation.

2. In the apparatus as defined in claim 1, wherein said casing defines an elongated power chamber aligned coaxially of said at least two implosion chamber, said piston rod assembly including a piston rod slidably extending between the respective implosion chamber and power chamber, and
    means communicating said power chamber with a pressurized source of a liquid actuating medium.

3. In the apparatus as defined in claim 2, wherein said piston rod assembly includes said at least two first piston head 30 and 34 which sealably engages walls of said implosion chamber, and a second piston head which sealably engages the walls of said power chamber.

4. In the apparatus as defined in claim 3, wherein said first piston head includes flow control means operable between open and closed positions to regulate the flow of water therethrough during reciprocatory movement of said first piston head.

5. In the apparatus as defined in claim 1, wherein said casing defining said elongated implosion chamber includes a substantially open remote end to the latter in communication with said body of water.

6. In the apparatus as defined in claim 5, wherein said means forming said implosion port is positioned adjacent to the implosion chamber open end.

7. In the apparatus as defined in claim 1, including pump means communicated with said power chamber, being operable to alternately deliver streams of water into opposed ends of the power chamber to achieve said reciprocatory movement of said piston rod assembly.

* * * * *